Patented July 10, 1951

2,560,037

UNITED STATES PATENT OFFICE 2,560,037

STABILIZATION OF RUBBERY COMPOSITIONS

Leland J. Kitchen, Akron, Ohio, assignor to The Firestone Tire & Rubber Company, Akron, Ohio, a corporation of Ohio No Drawing. Application July 25, 1947, Serial No. 763,758

3 Claims. (Cl. 260—45.95)

This invention relates to the stabilization of rubbery organic compositions, and more particularly to the stabilization without substantial discoloration of rubber-like butadiene polymerizates, and more particularly copolymers of acrylonitrile with butadiene-1,3. The invention includes the process of stabilization and stabilized products, both cured and uncured.

The stabilizers of this invention include the class of 2,6-di(alpha, alpha, gamma, gamma-tetramethylbutyl)-4-alkylphenols in which the alkyl group is preferably methyl but may contain one to about five carbon atoms, such as ethyl, either propyl, any amyl, and may be a mixture such as the product resulting from a process in which alkylation is effected with an alkylating agent in which different butyl or different amyl, etc. groups are present.

The invention includes the stabilization of rubbery copolymers derived from other conjugated dienes than butadiene-1,3 such as for example copolymers derived from isoprene, 2-cyanobutadiene, cyclopentadiene, piperylene, dimethylbutadiene, 2-methyl-1,3-pentadiene, etc. The invention includes also the stabilization of rubbery copolymers of a conjugated diene and compounds having the formula $CH_2=C(R)-CX$ when R is H, $CH_3$, $C_2H_5$, $C_3H_7$ or Cl and —CX is —CN, —$CONH_2$, —COOR' or —COR' when R' is an alkyl group which contains one to five carbon atoms. Reference is made to a copending application made jointly by me and George E. P. Smith, Jr., Serial No. 653,425, filed March 9, 1946, containing related subject matter.

The stabilizer may be used in amounts of 0.1 to about 10 percent. Ordinarily in the neighborhood of 2 to 4 percent will be employed. In the stabilization of synthetics the stabilizer may advantageously be added to the latex so as to be effective during drying of the latex as well as thereafter. If preferred it may be compounded with the dried rubber on the mill.

The following example illustrates one method of preparing the preferred stabilizer.

EXAMPLE 1

During three and one-half hours 896 grams of diisobutylene were added to 214 grams of p-cresol at a temperature of 10–20° C. with vigorous stirring. Twenty-one grams of catalyst (45 percent solution of boron trifluoride in ether) were added slowly during the first ninety minutes. The mixture was left standing at 40–45° C. for fifteen hours after the addition of the diisobutylene. It was then washed by thorough agitation with 30 percent NaOH solution. The oily layer was analyzed by fractionation through a column packed with Raschig rings, having an efficiency of about five theoretical plates. Eighty-one grams of the 2,6-di (alpha, alpha, gamma, gamma-tetramethylbutyl)-4 methylphenol were recovered as a light yellow, highly viscous liquid boiling at 168–195° C. at 5 millimeters. After two recrystallizations from methanol the product has a melting point of 51.6–52.2° C. The compound is sometimes referred to herein as 2,6-di-tertiary-octyl-4-methylphenol.

The other stabilizers of this invention may be similarly prepared using the appropriate starting phenol.

Various test data on the stabilization of various rubbery compositions, cured and uncured, follow. The control stabilizers used in the tests recorded are phenyl-beta-naphthylamine (designated PBN in the following tables) and a heptylated diphenylamine. These are two of the most widely used stabilizers for butadiene polymerizates, but are objectionable because they discolor. The stabilizers of this invention are shown by the reported experiments to be superior to these commercial stabilizers because they discolor less, and may be classed as non-discoloring stabilizers.

In what follows, the preferred stabilizer of this invention, 2,6-di-tertiary-octyl-4-methylphenol, was employed and is referred to in the tables as 2,6-4.

EXAMPLE 2

Two percent of the preferred stabilizer was added to a latex of the rubbery copolymer of butadiene and styrene commercially known as GR–S. On drying at any elevated temperature which would be used commercially the stabilizer prevents or inhibits discoloration. The dried products were aged two days at 110° C. with the following results:

Table 1.—Copolymer aging

| Stabilizer | Properties of Aged Copolymers | |
|---|---|---|
| | Quality | Color |
| None | Very poor | Medium brown. |
| 2, 6–4 | Good | Do. |
| PBN | Very good | Dark brown. |

The stabilizer of this invention is thus shown to impart age resistance without the discoloring tendency of phenyl-beta-naphthylamine.

EXAMPLE 3

Two percent of the preferred stabilizer of this invention and phenyl-beta-naphthylamine were added respectively to two different portions of a latex of rubbery copolymer from butadiene and acrylonitrile, with thirty percent acrylonitrile content. On drying the latter turned brown while there was no substantial discoloration of the former. The stabilizer is effective during drying at any elevated temperature without substantial discoloration. The dried products were aged ten days at 95° C. The properties of the two products are reported in the following table. The "break-down time" is a measure of the amount of set-up which has occurred as determined by the time required to break the material down on a mill.

*Table 2.—Copolymer aging*

| Stabilizer | Color before aging | Properties of aged Product | | |
|---|---|---|---|---|
| | | Color | Condition | Break-down Time |
| | | | | Sec. |
| 2, 6-4 | White | Light brown | Good | 14 |
| PBN | Brown | Dark brown | do | 14 |

EXAMPLE 4

A similar test was conducted on rubbery copolymer obtained from butadiene and acrylonitrile, but containing 36% acrylonitrile. The test also included a blank. The following table shows the results of aging the dried latices 4 days at 90° C.

*Table 3.—Copolymer aging*

| Stabilizer | Color before aging | Properties of Color | Aged Product Condition |
|---|---|---|---|
| None | Light tan | Dirty brown | Very poor. |
| 2, 6-4 | do | Light brown | Very good. |
| PBN | Brown | Dark brown | Do. |

Thus, the stabilizers of this invention are effective and relatively non-discoloring stabilizers for the latex coagulum.

EXAMPLE 5

Dried, stabilized latices prepared as in Example 3 were compounded according to the following formula:

| | |
|---|---|
| Copolymer plus stabilizer | 100.0 |
| Stearic acid | 3.5 |
| Zinc oxide | 5.0 |
| Carbon black (E. P. C.) | 40.0 |
| Sulfur | 2.0 |
| Accelerator | 1.3 |

The stocks were cured for eighty minutes at 274° F. On testing they were found to have the properties recorded in Table 4. (In Tables 4-7, the figures for tensile and modulus refer to pounds per square inch, and those for elongation refer to per cent elongation).

*Table 4.—Vulcanizate*

| Stabilizer Present | 2, 6-4 | PBN |
|---|---|---|
| Modulus at 300% Elongation | 750 | 625 |
| Tensile at Break | 2,825 | 2,975 |
| Elongation at Break | 620 | 650 |

These stocks were air bomb aged (60 pounds of air per square inch) for 10 hours at 260° F. The aged properties are recorded in the following table.

*Table 5.—Aged vulcanizate*

| Stabilizer Present | 2, 6-4 | PBN |
|---|---|---|
| Modulus at 300% Elongation | 2,075 | 2,275 |
| Tensile at Break | 2,625 | 3,175 |
| Elongation at Break | 350 | 380 |

Identical stocks were aged 4 days at 212° F. The aged properties are recorded below.

*Table 6.—Aged vulcanizate*

| Stabilizer Present | 2, 6-4 | PBN |
|---|---|---|
| Modulus at 300% Elongation | 2,725 | 2,725 |
| Tensile at Break | 3,187 | 3,550 |
| Elongation at Break | 340 | 350 |

EXAMPLE 6

The stock of Example 3 which had been aged 10 days at 95° C. was then compounded according to the formula given in Example 5. The properties of the aged stocks after curing are given below:

*Table 7.—Aged vulcanizate*

| Stabilizer Present | 2, 6-4 | PBN |
|---|---|---|
| Modulus at 300% Elongation | 900 | 975 |
| Tensile at Break | 3,462 | 3,425 |
| Elongation at Break | 650 | 630 |

The results of Examples 3-6 show that 2,6-di-tertiary-octyl-4-methylphenol affords excellent protection to rubbery butadiene-acrylonitrile copolymers, and that protection is afforded both the uncured copolymer and its vulcanizate.

EXAMPLE 7

Rubbery butadiene-acrylonitrile copolymer containing about thirty percent acrylonitrile was used in the next test. Two percent of phenyl-beta-naphthylamine, heptylated diphenylamine (designated as H. D. in Table 8), and the preferred stabilizer of this invention were added to three different portions of a latex of the copolymer. These latices and another portion which contained no stabilizer were dried and then compounded according to the following formula:

| | |
|---|---|
| Copolymer (with or without stabilizer) | 100.0 |
| Coumarone resin | 7.5 |
| Sulfur | 1.0 |
| Magnesium oxide | 5.0 |
| Zinc oxide | 85.0 |
| Neutral clay | 20.0 |
| Titanium dioxide | 20.0 |
| Accelerator | 1.3 |

The stocks were cured 40 minutes at 280° F. and then subjected to exposure tests. In one test samples were exposed in a fadeometer for ten hours at 125° F. In the other test different samples were exposed to a sun lamp for sixteen hours at a distance of seven inches. The following table records the color of the several samples after such exposures.

Table 8.—*Exposure tests on copolymer vulcanizate*

| Stabilizer | Fadeometer Test | Sun-Lamp Test |
|---|---|---|
| None | Light cream | Very light cream. |
| 2,6-4 | Very light cream | Off white. |
| PBN | Brown | Gray brown. |
| H. D | Light tan tinge | Light tan. |

The stock stabilized with the stabilizer of this invention discolored less than similar stock containing no antioxidant, and became discolored much less than the stocks stabilized with the commercial stabilizers.

Thus the stabilizers of this invention are effective with rubbery compositions, before and after curing. They stabilize the synthetic latices during drying. The invention is defined in the appended claims.

What I claim is:

1. A rubbery copolymer of butadiene and acrylonitrile stabilized with a relatively small amount of 2,6-di-tertiary-octyl-4-alkylphenol in which the alkyl group contains one to about five carbon atoms.

2. The method of producing stabilized vulcanizate which comprises curing rubbery copolymer of butadiene and acrylonitrile which contains as stabilizer a relatively small amount of a 2,6-di-tertiary-octyl-4-alkylphenol in which the alkyl group contains one to about five carbon atoms.

3. Vulcanizate of rubbery copolymer of butadiene and acrylonitrile stabilized with a relatively small amount of 2,6-di-tertiary-octyl-4-alkylphenol in which the alkyl group contains one to five carbon atoms.

LELAND J. KITCHEN.

REFERENCES CITED

The following references are of record in the file of this patent:

UNITED STATES PATENTS

| Number | Name | Date |
|---|---|---|
| 2,260,683 | Robbins et al. | Oct. 28, 1941 |
| 2,298,660 | Stevens et al. | Oct. 13, 1942 |
| 2,379,482 | Frolich | July 3, 1945 |
| 2,445,735 | Kitchen | July 20, 1948 |
| 2,470,447 | Van Gilder | May 17, 1949 |
| 2,471,887 | Nelson | May 31, 1949 |